(12) United States Patent
Theertham (10) Patent No.: US 11,092,021 B2
(45) Date of Patent: Aug. 17, 2021

(54) FAN PLATFORM WITH CORE AND SKIN

(71) Applicant: United Technologies Corporation, Farmington, CT (US)

(72) Inventor: Arun K. Theertham, Rocky Hill, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 13 days.

(21) Appl. No.: 16/404,108

(22) Filed: May 6, 2019

(65) Prior Publication Data

US 2020/0355082 A1     Nov. 12, 2020

(51) Int. Cl.
*F01D 5/30* (2006.01)
*F01D 5/02* (2006.01)

(52) U.S. Cl.
CPC ............ *F01D 5/3053* (2013.01); *F01D 5/02* (2013.01); *F05D 2230/23* (2013.01); *F05D 2240/80* (2013.01); *F05D 2260/30* (2013.01); *F05D 2300/603* (2013.01)

(58) Field of Classification Search
CPC .... F01D 5/3053; F01D 5/3069; F01D 5/3092; F01D 5/323; F01D 5/326; F01D 11/008; F01D 11/006; F01D 11/001
USPC ..................................................... 416/204 R
See application file for complete search history.

(56) References Cited

U.S. PATENT DOCUMENTS

| | | | |
|---|---|---|---|
| 5,281,096 A * | 1/1994 | Harris | F01D 11/008 |
| | | | 416/193 A |
| 5,421,704 A | 6/1995 | Carletti et al. | |
| 6,447,250 B1 * | 9/2002 | Corrigan | F04D 29/321 |
| | | | 416/193 A |
| 9,267,386 B2 * | 2/2016 | Turner | F01D 11/008 |
| 9,739,162 B2 | 8/2017 | Bottome et al. | |
| 10,018,055 B2 | 7/2018 | Robertson | |
| 10,233,939 B2 | 3/2019 | De Gaillard et al. | |
| 2006/0127217 A1 * | 6/2006 | McMillan | F01D 5/282 |
| | | | 415/200 |
| 2016/0160663 A1 | 6/2016 | Mortier et al. | |
| 2016/0341071 A1 | 11/2016 | Alarcon et al. | |
| 2018/0238177 A1 * | 8/2018 | Turner | B29C 70/84 |
| 2019/0112934 A1 | 4/2019 | Heeter et al. | |

FOREIGN PATENT DOCUMENTS

| | | |
|---|---|---|
| EP | 3643885 | 4/2020 |
| EP | 3693548 | 8/2020 |

OTHER PUBLICATIONS

European Search Report for European Patent Application No. 20170925.0 completed Sep. 3, 2020.

* cited by examiner

*Primary Examiner* — Richard A Edgar
(74) *Attorney, Agent, or Firm* — Carlson, Gaskey & Olds, P.C.

(57) ABSTRACT

A fan platform includes a platform body that has gaspath and non-gaspath sides, leading and trailing ends, first and second circumferential sides that are contoured to follow profiles of adjacent fan blades, and lugs that project from the non-gaspath side and define fastener openings. The platform body includes a core and a fiber-reinforced polymer matrix composite skin attached on the core at least on portions of the gaspath and non-gaspath sides.

19 Claims, 6 Drawing Sheets

FAN PLATFORM WITH CORE AND SKIN

BACKGROUND

Gas turbine engines typically include a compressor, a combustor, and a turbine that operate in a known manner to rotate a fan to provide thrust. The fan includes fan blades that are attached to a hub. There may be platforms between the fan blades near the hub that serve to provide an inner diameter boundary for air entering the fan blades. The platforms are typically secured to the hub, such as by a fastener pin.

SUMMARY

A fan platform according to an example of the present disclosure includes a platform body that has gaspath and non-gaspath sides, leading and trailing ends, first and second circumferential sides that are contoured to follow profiles of adjacent fan blades, and lugs projecting from the non-gaspath side that define fastener openings. The platform body includes a core and a fiber-reinforced polymer matrix composite skin attached on the core at least on the gaspath and non-gaspath sides.

In a further embodiment of any of the foregoing embodiments, the skin is also attached on the lugs.

In a further embodiment of any of the foregoing embodiments, the core includes lug stubs, and there are lug pieces adhesively bonded to the lug stubs. The lug pieces contain the fastener openings.

In a further embodiment of any of the foregoing embodiments, the lug pieces are selected from the group consisting of polymer blocks, metal blocks, and combinations thereof.

In a further embodiment of any of the foregoing embodiments, the core is formed of a material selected from the group consisting of honeycomb, foam, and combinations thereof.

In a further embodiment of any of the foregoing embodiments, the core is formed of a closed-cell foam.

In a further embodiment of any of the foregoing embodiments, the core is bare and exposed on at least a portion of the leading end, the trailing end, the first circumferential side, or the second circumferential side.

In a further embodiment of any of the foregoing embodiments, the platform body further includes an environmental barrier layer disposed on at least a portion of the core that does not have the skin.

In a further embodiment of any of the foregoing embodiments, the environmental barrier layer is selected from the group consisting of a glass fiber-reinforced material, an elastomer material, and combinations thereof.

In a further embodiment of any of the foregoing embodiments, the environmental barrier layer includes a fluoropolymer.

In a further embodiment of any of the foregoing embodiments, the fastener openings are axially aligned.

In a further embodiment of any of the foregoing embodiments, the core thickens from the leading end to the trailing end.

In a further embodiment of any of the foregoing embodiments, the platform body further includes an adhesive between the skin and the core.

In a further embodiment of any of the foregoing embodiments, the core includes lug stubs, and there are lug pieces adhesively bonded to the lug stubs. The lug pieces contain the fastener openings. The core is formed of a material selected from the group consisting of honeycomb, foam, and combinations thereof, and the lug pieces are selected from the group consisting of polymer blocks, metal blocks, and combinations thereof.

In a further example of the present disclosure, the fan platform is included in a fan of a gas turbine engine that also includes a compressor section, a combustor, and a turbine section.

In a further embodiment of any of the foregoing embodiments, the core has lug stubs, and there are lug pieces adhesively bonded to the lug stubs. The lug pieces contain the fastener openings. The core is formed of a material selected from the group consisting of honeycomb, foam, and combinations thereof, and the lug pieces are selected from the group consisting of polymer blocks, metal blocks, and combinations thereof.

A method of fabricating a fan platform according to an example of the present disclosure includes forming a platform body that has gaspath and non-gaspath sides, leading and trailing ends, first and second circumferential sides that are contoured to follow profiles of adjacent fan blades, and lugs that project from the non-gaspath side and define fastener openings. The forming includes arranging one or more layers of a fiber-reinforced polymer matrix composite skin on a core at least on the gaspath and non-gaspath sides.

A further embodiment of any of the foregoing embodiments includes, prior to the arranging, adhesively bonding lug pieces to lug stubs on the core. The lug pieces contain the fastener openings.

A further embodiment of any of the foregoing embodiments includes applying an environmental barrier layer on at least a portion of the core that does not have the skin. The environmental barrier layer is selected from the group consisting of a glass fiber-reinforced material, fluoropolymer, and combinations thereof.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
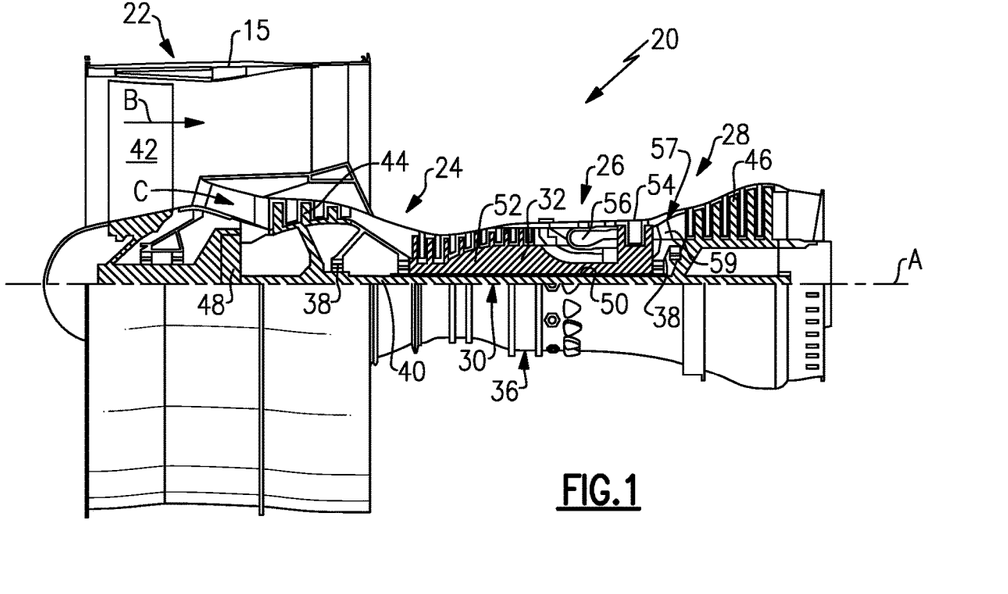
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{}0.5$. The "Low corrected fan tip speed" as disclosed herein according to one non-limiting embodiment is less than about 1150 ft/second (350.5 meters/second).

The example gas turbine engine 20 includes the fan section 22 that comprises in one non-limiting embodiment less than about 26 fan blades 42. In another non-limiting embodiment, the fan section 22 includes less than about 20 fan blades 42. Moreover, in one disclosed embodiment the low pressure turbine 46 includes no more than about 5 turbine rotors. In another disclosed embodiment, the low pressure turbine includes about 6 rotors. In another non-limiting example embodiment, the low pressure turbine 46 includes about 3 turbine rotors. In yet another disclosed embodiment, the number of turbine rotors for the low pressure turbine 46 may be between 3 and 6. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Figure 2:
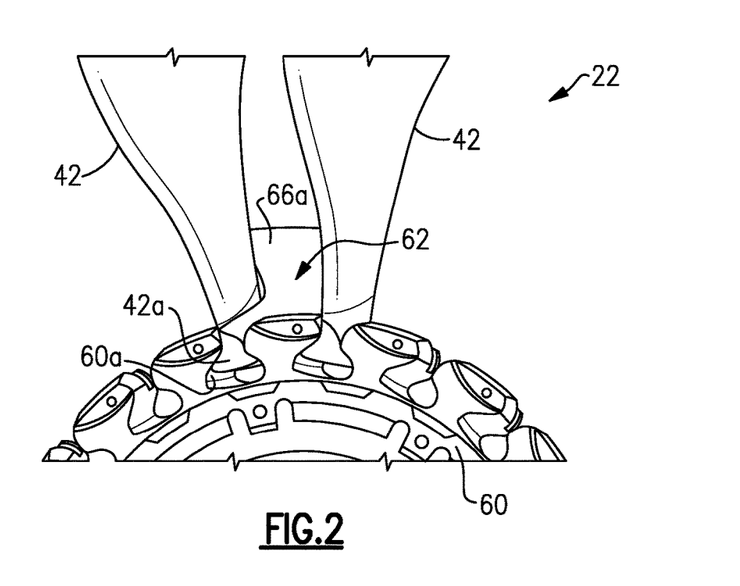
FIG. 2 illustrates selected portions from the fan section of the engine of FIG. 1.

Selected portions of the fan section 22 are shown in FIG. 2. The fan blades 42 (two shown) are attached to a fan hub 60. For example, each fan blade 42 has a root 42a that is received axially into a corresponding slot 60a in the rim of the hub 60. The slot 60a radially secures the blade 42. In one embodiment, the roots 42a are a dovetails and the slots 60a are doveslots.

Figure 3:
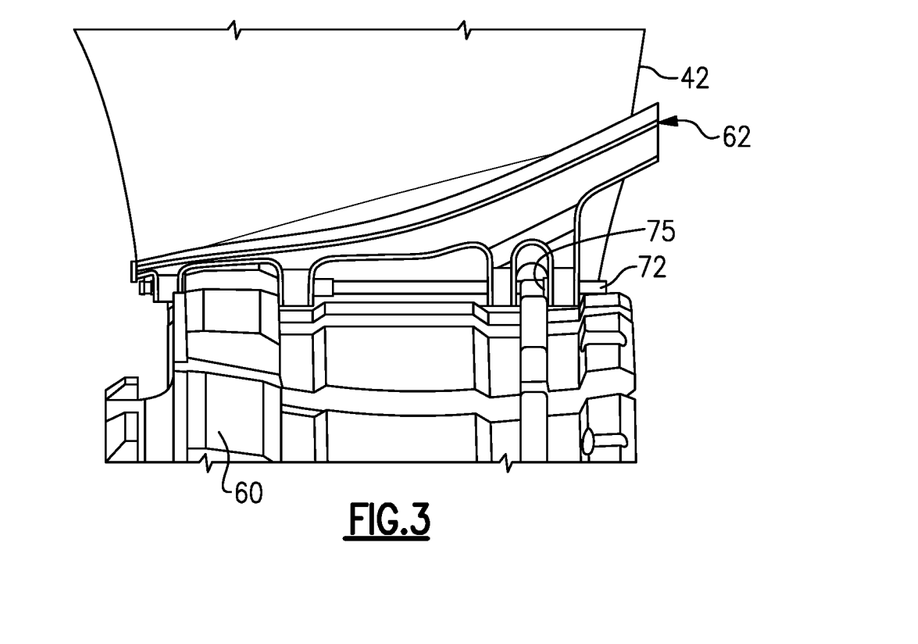
FIG. 3 illustrates an elevation view of the fan hub, a fan blade, and a fan platform in the fan section.
Figure 4:
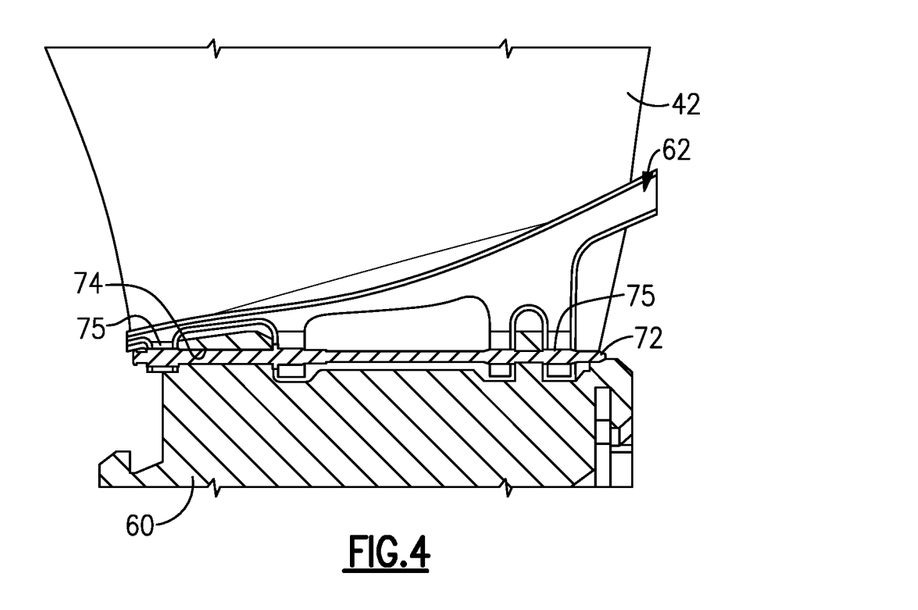
FIG. 4 illustrates a sectional view of the joint between the fan platform and the hub.

Between each adjacent pair of blades 42 there is a fan platform 62, which is also shown in an elevation view in FIG. 3 and a sectional view in FIG. 4. The fan platform 62 serves to provide an inner diameter boundary for air coming into the fan blades 42.

Figure 5:
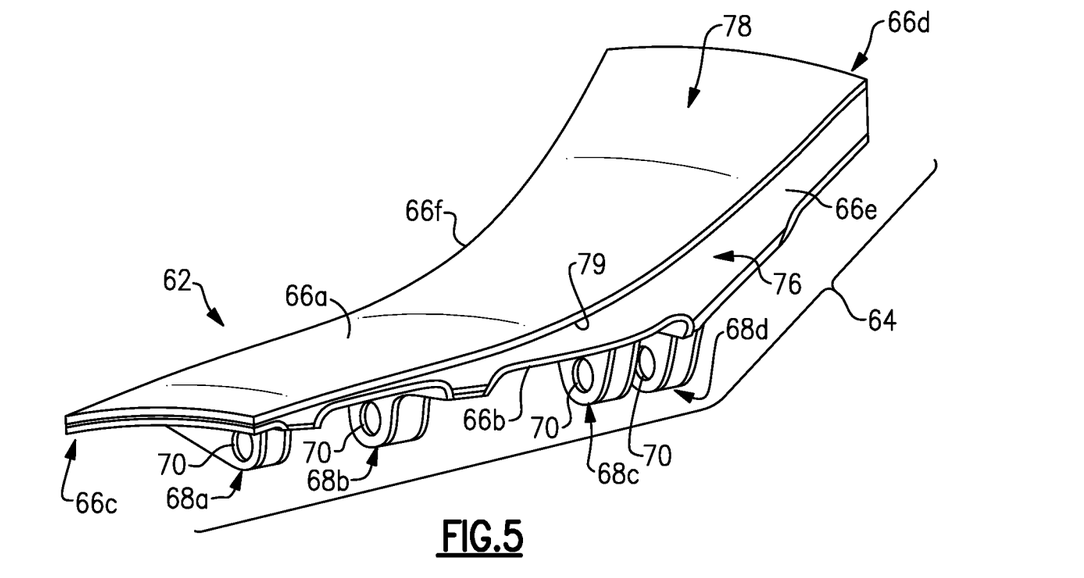
FIG. 5 illustrates an isolated view of the fan platform.
Figure 6:
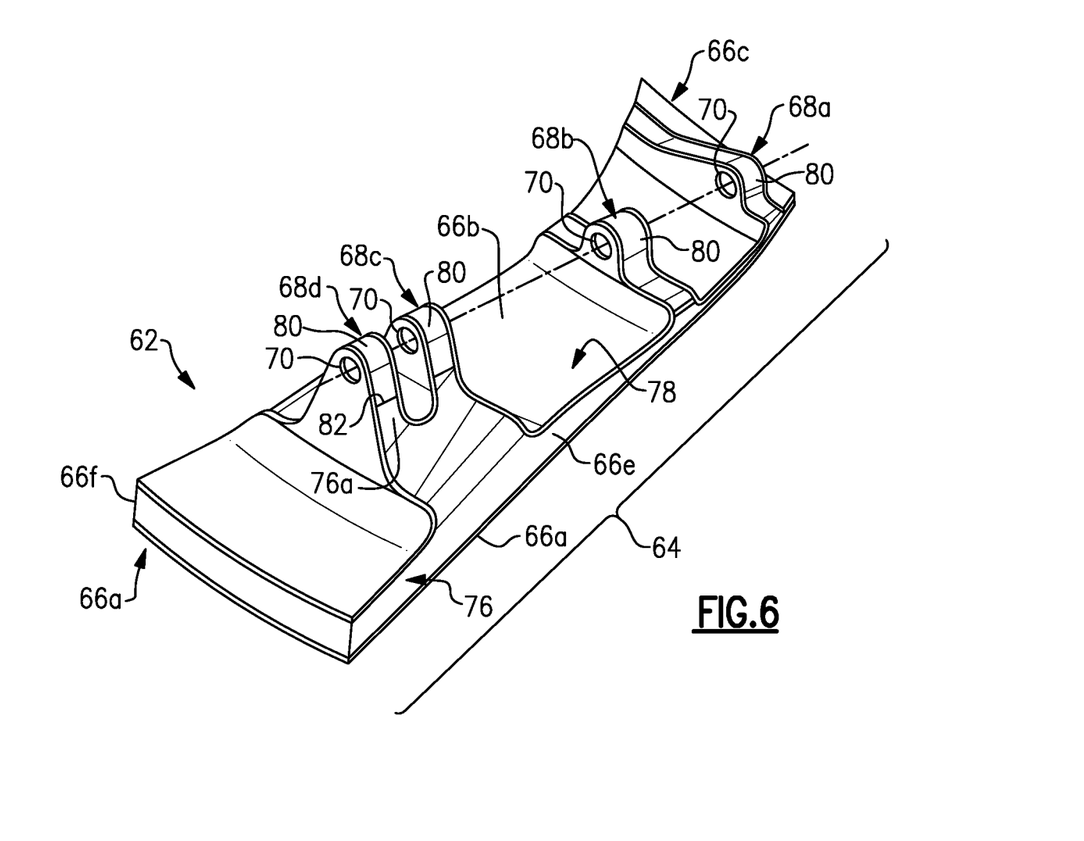
FIG. 6 illustrates another isolated view of the fan platform.

FIGS. 5 and 6 illustrate isolated views of the fan platform 62. The fan platform 62 generally includes a platform body 64 that defines a gaspath side 66a, a non-gaspath side 66b, a leading end 66c, a trailing end 66d, a first circumferential side 66e, and a second circumferential side 66f. The gaspath side 66a generally faces radially outwards away from the slots 60a in the hub 60, while the non-gaspath side 66b faces radially inwards towards the slots 60a. The leading end 66c faces toward the front of the engine 20 and the trailing end 66d faces toward the rear of the engine 20. The circumferential sides 66e/66f are contoured to follow the aerodynamic profiles of the adjacent fan blades 42. For example, the circumferential sides 66e/66f may abut the blades 42 or interface with seals that abut the blades 42.

The platform body 64 includes lugs 68a/68b/68c/68d that project from the non-gaspath side 66b. The lugs 68a/68b/68c/68d each define a respective fastener opening 70. For example, the openings 70 are coaxial such that a fastener 72 (FIGS. 3 and 4) can be received there through. The fastener 72 is also received through corresponding openings 74 in the rim of the hub 60 to secure the fan platform 62 to hub 60. Optionally, one or more bushings 75 can be used with the fastener 72 to facilitate mounting.

The platform body 64 is formed of several distinct sections. As best shown in FIGS. 5 and 6, the platform body 64 includes a core 76 and a fiber-reinforced polymer matrix composite skin 78 attached on the core 76 at least on portions of the gaspath side 66a and non-gaspath side 66b. As an example, the skin 78 is adhesively attached by an adhesive layer 79, such as an epoxy adhesive. The core 76 is relatively lightweight and provides a substrate for the skin 78, which is conformal with the core 76. As an example, the core 76 may be formed of a honeycomb or a foam. One example foam is a closed-cell polymer foam. In the illustrated example, the core 76 thickens in the radial dimension from the leading end 66c to the trailing end 66d (e.g., tapers from the trailing end 66d to the leading end 66c). Such a geometry may be used to facilitate meeting space requirements and also enhance bending stiffness.

The skin 78 is generally strong and durable. For example, the skin is formed of a high strength fibers, such as carbon fibers, glass fibers, or aramid fibers, disposed in a polymer matrix, such as an epoxy matrix. In one embodiment, the fibers are provided as a woven fabric. In another embodiment, the fibers are unidirectional. In additional embodiments, the skin 78 may be formed of multiple fiber layers, including multiple woven layers, multiple unidirectional layers that alternate in fiber direction, or multiple woven and unidirectional layers.

Although the core 76 and skin 78 may have considerable strength, there may be elevated stresses at the lugs 68a/68b/68c/68d. In this regard, the lugs 68a/68b/68c/68d are formed, at least in part, by lug pieces 80 that are composed of a different, stronger material than at least the core 76. For example, the lug pieces 80 are formed of blocks of a polymer material or metal which includes the openings 70. In one embodiment, the polymer material is a reinforced polymer matrix composite. For example, the reinforced polymer matrix composite is a laminate formed of multiple fiber layers, such as woven and/or unidirectional fiber layers, disposed in a polymer matrix. In one further example, the fibers of the fiber layers are high strength fibers, such as carbon fibers, and the polymer matrix is epoxy. In one alternative example, the reinforced polymer matrix composite is a discontinuous fiber composite that includes short fibers disposed in a polymer matrix. In one example of a metal block, the metal is aluminum or steel.

The core 76 includes lug stubs 76a at which the respective lug pieces 80 are attached. The lug stubs 76a are relatively short projections that have an interface surface for receiving the lug pieces 80. For instance, the interface surfaces are flat surfaces that receive and interface with corresponding flat surfaces on the lug pieces 80. In one example, the lug pieces 80 are adhesively bonded by an adhesive layer 82 to the lug stubs 76a.

As shown in FIGS. 5 and 6, the skin 78 does not completely cover the core 76. In this example, the skin 78 completely covers the gaspath side 66a and portions of the non-gaspath side 66b but does not cover portions of the lugs 68a/68b/68c/68d, the side of the leading end 66d, the side of the trailing end 66c, or the circumferential sides 66e/66f. These portions of the core 76 are thus bare and exposed. If erosion, infiltration of air and/or foreign debris, or other environmental factors are not of concern, those portions may be left bare in the final fan platform 62.

Figure 7:
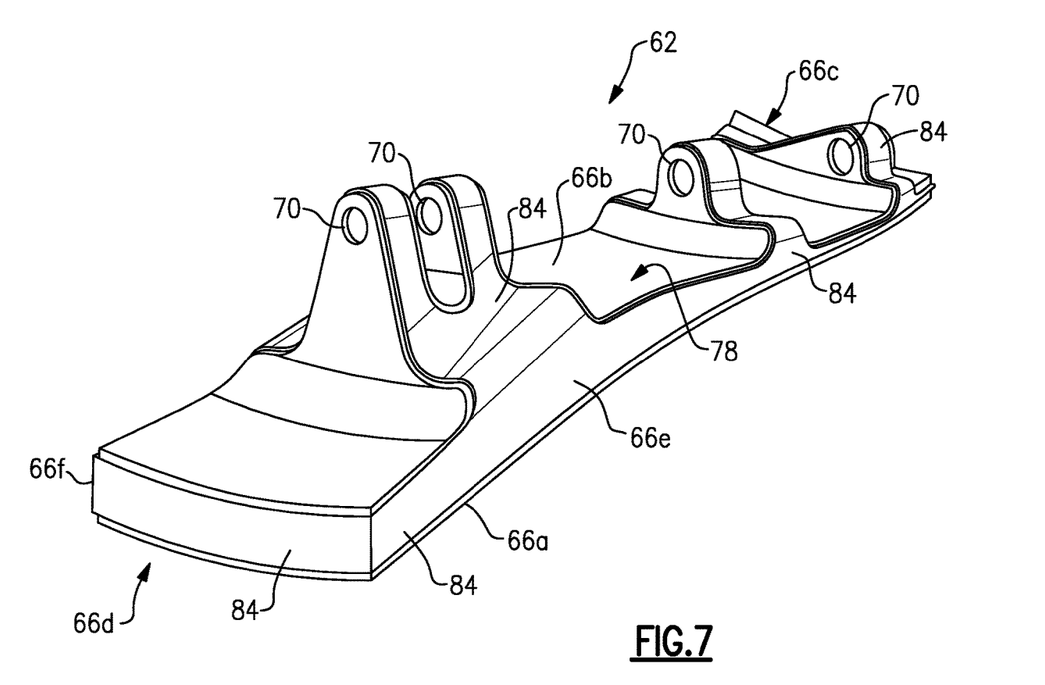
FIG. 7 illustrates a fan platform with an environmental barrier layer.

Referring to a modified example of the fan platform 62 in FIG. 7, if greater resistance to environmental factors is desired, the fan platform 62 may be provided with an environmental barrier layer 84 on those portions that were bare in the prior example, i.e., the portions of the lugs 68a/68b/68c/68d, the side of the leading end 66d, the side of the trailing end 66c, and the circumferential sides 66e/66f. In one example, the skin 78 and the environmental barrier layer 84 completely encase the core 76 such that no exterior portion of the core 76 is bare. Even if additional environmental resistance is not desired, the layer 84 may be utilized to strengthen or stiffen the fan platform 62.

In embodiments, the environmental barrier layer 84 is a glass fiber-reinforced material, an elastomer material, or a combinations thereof. For instance, the environmental barrier layer 84 is a glass fiber-reinforced material that includes discontinuous glass fibers disposed in a polymer matrix, such as an epoxy matrix. In another example, the environmental barrier layer 84 includes a fluoropolymer. As an example, the environmental barrier layer 84 is a continuous layer of the fluoropolymer. In one embodiment, the fluoropolymer is VITON.

Figure 8:
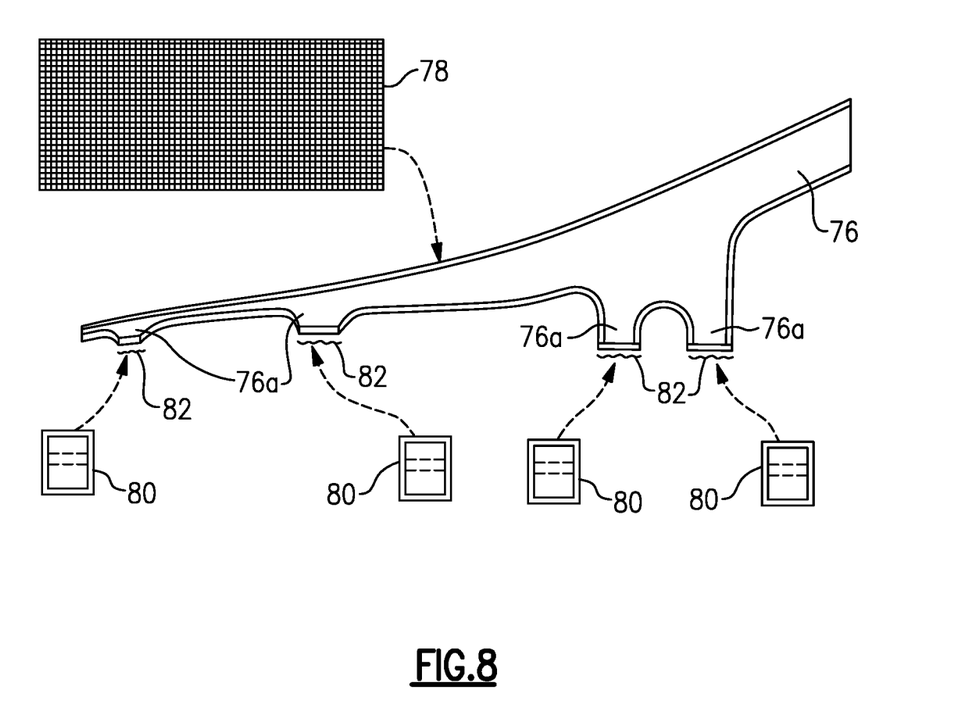
FIG. 8 depicts a method of fabricating a fan platform.

FIG. 8 depicts a method of fabricating the fan platform 62. The method generally includes forming the platform body 64 by arranging one or more layers of the fiber-reinforced polymer matrix composite skin 78 on the core 76 at least on portions of the gaspath and non-gaspath sides 66a/66b. For instance, as shown, the core 76 is initially provided without any skin 78 or lug pieces 80 attached. In one embodiment, the core 76 is provided as a pre-fabricated piece in a desired geometry. In an alternate example, the core 76 is formed to the desired geometry from a starting or blank shape. For instance, the core 76 is machined or cut from an initial piece of stock foam or honeycomb.

Thereafter, the lug pieces 80 are attached to the lug stubs 76a by applying the adhesive 82 to the lug stubs 76a, the lug pieces 80, or both and then moving the lug pieces 80 onto the lug stubs 76a. Once the adhesive dries or cures, at least enough to permit handling without inadvertent dislodging, the lug pieces 80 are secured to the core 76.

After securing the lug pieces 80 to the core 76, one or more layers of the skin 78 are applied to the core 76. For instance, if the layers are fiber layers that are pre-impregnated with matrix material, the layers may be tacky and adhere to the core 76 to permit application without the addition of the adhesive 79. If the layers are not tacky or are not tacky enough to adhere, the adhesive 79 is applied to the layer, the core 76, or both. For instance, the fiber layers are dry fiber layers that do not contain any of the matrix material. In this regard, the matrix material may be introduced in a later step, such as by resin transfer, compression molding, or the like. If the matrix material is introduced in this manner, use of a closed-cell foam for the core 76 prevents the resin from infiltrating from the fiber layer into the core 76, which could otherwise leave voids in the skin 78. Once the fibers and matrix material are in place on the core 76, a curing step may be conducted to cure the matrix material. For example, the curing step involves a thermal curing in which heat is applied above a curing temperature of the matrix material for a period of time until the matrix material is substantially or fully cured.

Figure 9:
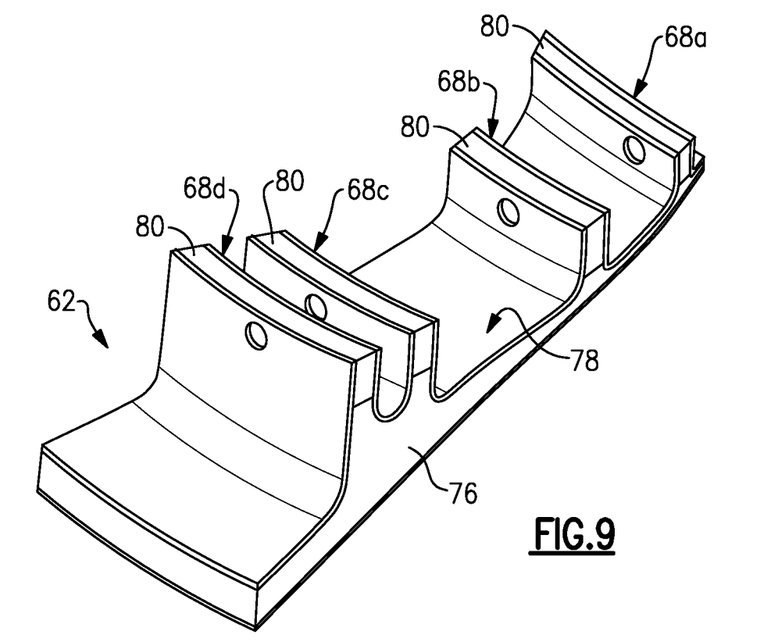
FIG. 9 illustrates the fan platform during fabrication, before a machining operation.
Figure 10:
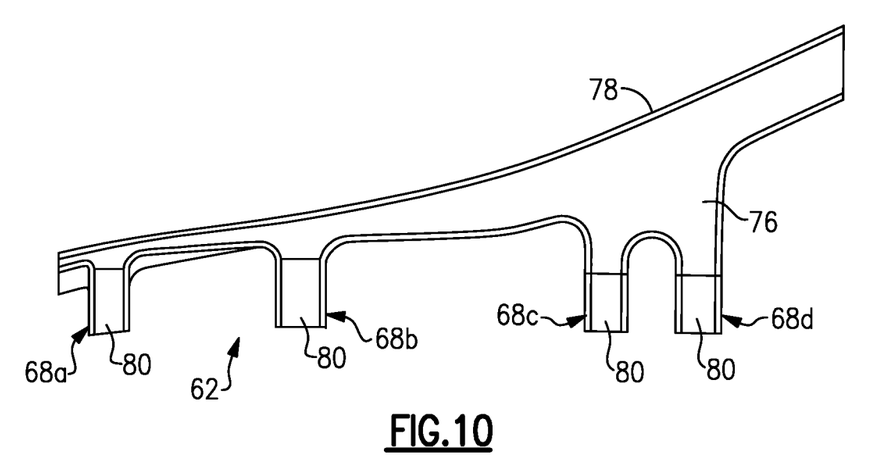
FIG. 10 illustrates an elevation view of the fan platform of FIG. 9.

After curing, as shown in FIGS. 9 and 10, the fan platform 62 may still require additional processing steps to achieve a final desired geometry. For instance, the skin 78 may be trimmed or smoothed and/or the lugs 68a/68b/68c/68d may be machined. In the example shown, the lugs 68a/68b/68c/68d initially have a rectangular geometry but are machined to achieve the rounded geometry shown in FIG. 6, which may also serve to reduce weight. If the environmental barrier layer 84 is used, the environmental barrier layer 84 is then applied at least to the bare regions of the core 76, including those portions exposed by machining. If required, the environmental barrier layer 84 is cured, such as in a thermal curing process. The environmental barrier layer 84 may thereafter be trimmed, smoothed, or machined as appropriate to achieve a final desired geometry.

The use of the core 76 and skin 78 also permits the fabrication process to be readily adapted for different designs. For instance, it may be desirable that the contour of the aerodynamic gaspath side 66a of the fan platform 62 not be varied from one design to another. Yet, the geometry of the hub 60 may differ between the two designs such that there is more or less design space for the lugs. In this regard, the lugs can be readily redesigned in location and size to accommodate the space available. The fabrication process, however, can remain generally the same between the two designs, as the core 76 and lug pieces 80 are just provided or formed according to the different designs. In contrast, for a platform that is cast or molded, entirely new tooling may be required for the different designs.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A fan platform comprising:
a platform body having
gaspath and non-gaspath sides,
leading and trailing ends,
first and second circumferential sides that are contoured to follow profiles of adjacent fan blades, and
lugs projecting from the non-gaspath side and defining fastener openings,
wherein the platform body comprises a core formed of a material selected from the group consisting of honeycomb, foam, and combinations thereof, a fiber-reinforced polymer matrix composite skin attached on the core at least on the gaspath side and portions of the non-gaspath side, and an environmental barrier layer that is formed of a different material than the skin and is disposed on at least a portion of the core that does not have the skin.

2. The fan platform as recited in claim 1, wherein the skin is also attached on the lugs.

3. The fan platform as recited in claim 1, wherein the core includes lug stubs, and the lugs are formed, at least in part, by lug pieces adhesively bonded to the lug stubs, the lug pieces containing the fastener openings.

4. The fan platform as recited in claim 3, wherein the lug pieces are selected from the group consisting of polymer blocks, metal blocks, and combinations thereof.

5. The fan platform as recited in claim 1, wherein the core is formed of a closed-cell foam.

6. The fan platform as recited in claim 5, wherein the core is bare and exposed on at least a portion of the leading end, the trailing end, the first circumferential side, or the second circumferential side.

7. The fan platform as recited in claim 1, wherein the environmental barrier layer is selected from the group consisting of a fluoropolymer, an elastomer material, and combinations thereof.

8. The fan platform as recited in claim 1, wherein the environmental barrier layer includes a fluoropolymer.

9. The fan platform as recited in claim 1, wherein the fastener openings are axially aligned.

10. The fan platform as recited in claim 1, wherein the core thickens from the leading end to the trailing end.

11. The fan platform as recited in claim 1, wherein the platform body further comprises an adhesive between the skin and the core.

12. The fan platform as recited in claim 1, wherein the skin and the environmental barrier layer together completely encase the core.

13. The fan platform as recited in claim 1, wherein the environmental barrier layer includes discontinuous glass fibers.

14. The fan platform as recited in claim 1, wherein the skin covers a forward and an aft face of the lugs.

15. The fan platform as recited in claim 14, wherein the skin is not on circumferential faces of the lugs.

16. A gas turbine engine comprising:
a fan;
a compressor section;
a combustor; and
a turbine section,
wherein the fan includes fan blades and fan platforms arranged between the fan blades, each said fan platform including
a platform body having
gaspath and non-gaspath sides,
leading and trailing ends,
first and second circumferential sides that are contoured to follow profiles of adjacent fan blades, and
lugs projecting from the non-gaspath side and defining fastener openings,
wherein the platform body comprises a core and a fiber-reinforced polymer matrix composite skin attached on the core at least on the gaspath and non-gaspath sides, and the core thickens from the leading end to the trailing end,
wherein the core includes lug stubs, and the lugs are formed, at least in part, by lug pieces adhesively bonded to the lug stubs, the lug pieces containing the fastener openings, the core is formed of a material selected from the group consisting of honeycomb, foam, and combinations thereof, and the lug pieces are selected from the group consisting of polymer blocks, metal blocks, and combinations thereof.

17. A method of fabricating a fan platform, the method comprising:
forming a platform body that has
gaspath and non-gaspath sides,
leading and trailing ends,
first and second circumferential sides that are contoured to follow profiles of adjacent fan blades, and
lugs that project from the non-gaspath side and define fastener openings,
by arranging one or more layers of a fiber-reinforced polymer matrix composite skin on a core at least on the gaspath side and a portion of the non-gaspath side and applying, on at least a portion of the core that does not have the skin, an environmental barrier layer that is formed of a different material than the skin, wherein the core is formed of a material selected from the group consisting of honeycomb, foam, and combinations thereof.

18. The method as recited in claim 17, further comprising, prior to the arranging, adhesively bonding lug pieces to lug stubs on the core to form the lugs, the lug pieces containing the fastener openings.

19. The method as recited in claim 17,
wherein the environmental barrier layer is selected from the group consisting of a elastomer, fluoropolymer, and combinations thereof.

\* \* \* \* \*